(No Model.)
W. JOHNSON.
BICYCLE.
No. 546,668. Patented Sept. 24, 1895.
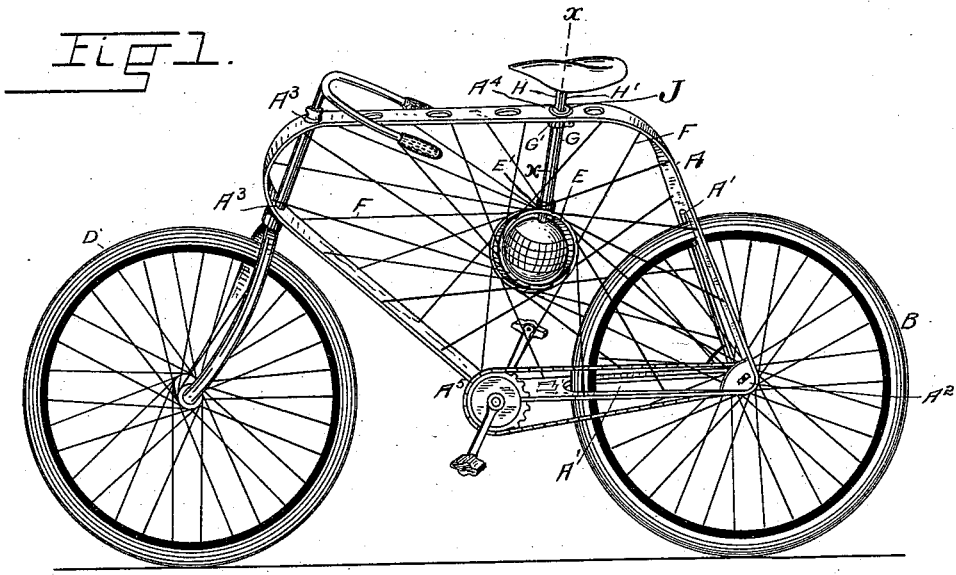
Fig. 1.
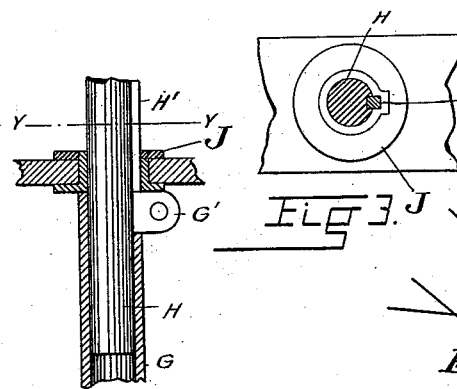
Fig. 2.
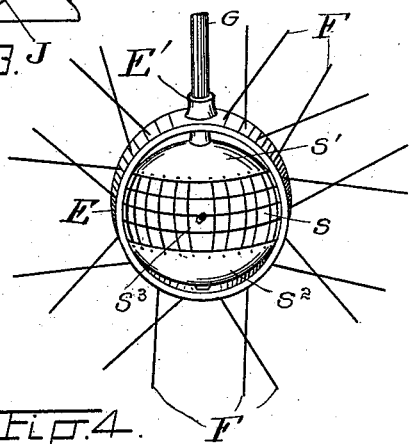
Fig. 3.
Fig. 4.
WITNESSES:
INVENTOR
Walder Johnson

UNITED STATES PATENT OFFICE.

WALTER JOHNSON, OF DENVER, COLORADO, ASSIGNOR OF ONE-HALF TO CHARLES TWIST AND FREDERICK J. STERNER, OF SAME PLACE.

BICYCLE.

SPECIFICATION forming part of Letters Patent No. 546,668, dated September 24, 1895.

Application filed December 27, 1894. Serial No. 533,111. (No model.)

*To all whom it may concern:*

Be it known that I, WALTER JOHNSON, a citizen of the United States, residing at Denver, in the county of Arapahoe and State of Colorado, have invented certain new and useful Improvements in Bicycles; and I do hereby declare the following to be a full, clear, and exact description of the invention, such as will enable others skilled in the art to which it appertains to make and use the same.

My invention relates to improvements in bicycles; and the objects of my improvements are to produce a bicycle so constructed as to combine lightness in weight with great strength and durability, and in which the weight of the rider is distributed equally over all parts of the frame, thereby taking away the strain from any particular part of the machine and lessening the jarring caused by uneven roads.

I attain these objects by the mechanism illustrated in the accompanying drawings, in which—

Figure 1 is a perspective view of my invention. Fig. 2 represents an enlarged section taken along the line $x\ x$ of Fig. 1, the top and bottom part of the post being broken away. Fig. 3 represents a section taken along the line $y\ y$ of Fig. 2, and Fig. 4 represents an enlarged perspective view of the circular frame and cushion contained therein.

Similar reference characters refer to similar parts throughout the several views.

In Fig. 1, A represents the bicycle-frame, supposed to be made of wood or any other light material. This frame is provided with a groove A′ to admit the hind wheel B, while it is provided with suitable boxes or bearings $A^2$ to support the axle of said wheel. The front part of the frame A is provided with openings $A^3$ and $A^3$ to admit the steering-tube C, which is connected with the front or steering wheel D.

Inside of the frame A, and as nearly as possible at equal distances from all the points of said frame, is a smaller frame E made of metal, wood, or any other suitable material, and connected to the frame A by means of wire spokes F F, &c.

The frame E, which is illustrated in the drawings as being of circular shape, which is the shape preferred, may be made of any shape desired, and is provided with a circular opening E′, through which passes the tube G, inside of which and securely fastened to it by means of a clamp G′ is the saddle-post H, which passes through an opening $A^4$ in frame A, and to the upper end of which the seat is fastened. The saddle-post H is provided with a square key H′, which slides through a similarly-shaped recess in a bearing or box J, which is placed inside of the opening $A^4$ in the frame A. Inside of frame E a pneumatic cushion, as shown in Fig. 4, is placed. This may be made of rubber or any other flexible material filled with compressed air, or a solid rubber ball may be used. This cushion S is placed inside of the frame E in between two cups S′ and $S^2$, which are connected by means of a network $S^3$. The lower one of these cups rests on the inside of the ring, while the upper one is connected to the tube G, to which the saddle-post H is fastened. The cushion S is provided with a valve through which the cushion is inflated. Now supposing the rider seats himself on the saddle, the weight of his body will compress the air-cushion S and press upon the inside of the frame E, from whence, by means of the spokes F, it will be distributed over all parts of the main frame A. This distribution of the weight will render the use of a very light frame possible. In case the rider encounters an obstacle on the road, as is often the case, the wheels passing over it will lift the frame, which will slide upward relative to the saddle-post while the jar is taken up by the cushion S. The key H′, while allowing the saddle-post to have a vertical movement, will prevent it from turning. It will be understood that instead of the box J a ball-bearing or any other device may be employed to lessen friction. The saddle-post H may be brought to any desired height by loosening the clamp G′ on the tube G. At the point $A^5$ the frame A is furthermore provided with a bearing for the pedal-shaft. The herein-described frame being made narrow renders it possible to place the pedals close together. This has the advantage of enabling the rider to give a more directly downward push on said pedals.

It will be obvious that many modifications of the herein-described device might be made which could be used without departing from the spirit of my invention.

Having thus described my invention, what I claim, and desire to secure by Letters Patent of the United States, is—

1. In a bicycle, the combination with an outer frame, of a smaller frame inclosed therein; spokes connecting the two frames, a seat support passing through parts of the two frames and adapted to move vertically therein, and an elastic connection between said inner frame and said seat support, substantially as described.

2. In a bicycle, the combination with an outer frame, of a smaller frame inclosed therein; spokes connecting the two frames, a seat support passing through parts of the two frames, and adapted to move vertically therein, and a pneumatic cushion mounted in said inner frame and supporting said seat support, substantially as described.

3. In a bicycle, the combination with an outer frame forming bearings for the guide tube, seat post and hind wheel, and slotted to admit the periphery of the hind wheel; of an inner frame inclosed within the outer frame; spokes connecting the two frames; a seat support passing through parts of the two frames, and adapted to move vertically therein; and an elastic connection between said inner frame and said seat support, substantially as described.

4. In a bicycle, the combination with an outer frame forming bearings for the guide tube, seat post and hind wheel, and slotted to admit the periphery of the hind wheel; of an inner frame inclosed within the outer frame; spokes connecting the two frames; and a seat support passing through parts of the two frames, and adapted to move vertically therein, substantially as described.

In testimony whereof I affix my signature in presence of two witnesses.

WALTER JOHNSON.

Witnesses:
  JAS. H. THOMAS,
  ROBT. A. BENNET.